United States Patent [19]
Knop

[11] 4,082,438
[45] Apr. 4, 1978

[54] ZERO-ORDER DIFFRACTIVE SUBTRACTIVE FILTER PROJECTOR

[75] Inventor: Karl Knop, Zurich, Switzerland

[73] Assignee: RCA Corporation, New York, N.Y.

[21] Appl. No.: 682,147

[22] Filed: Apr. 30, 1976

[30] Foreign Application Priority Data

May 30, 1975 United Kingdom ............... 23629/75

[51] Int. Cl.² .............................................. G03B 21/14
[52] U.S. Cl. .......................................... 353/97; 353/38;
350/162 R
[58] Field of Search ............................ 353/38, 97, 84;
350/162 SF, 162 R, 167

[56] References Cited

U.S. PATENT DOCUMENTS

| 2,604,002 | 9/1952 | Wengel | 350/167 |
| 2,805,599 | 9/1957 | Pajes | 350/162 R |
| 2,813,146 | 11/1957 | Glenn | 350/162 R |
| 2,985,866 | 5/1961 | Norton | 350/162 R |
| 3,216,318 | 11/1965 | Gafford | 353/97 |
| 3,944,350 | 3/1976 | Yevick | 353/38 |

*Primary Examiner*—Harry N. Haroian
*Attorney, Agent, or Firm*—H. Christoffersen; Samuel Cohen; George J. Seligsohn

[57] ABSTRACT

A projector for projecting pictures from zero-order diffractive subtractive filters, which may make use of an extraordinarily large amount of light flux, is achieved by a mask which transmits zero order light through an array of transparent regions separated by opaque regions which block higher diffraction order light.

7 Claims, 6 Drawing Figures

HEXAGONAL MASK

STRIPE MASK

ZERO-ORDER DIFFRACTIVE SUBTRACTIVE FILTER PROJECTOR

This invention relates to a projector for projecting pictures derived from zero-order diffractive subtractive filters and, more particularly, to such a projector which may make use of an extraordinarily large amount of light flux.

Both color and black-and-white diffractive subtractive filters are known in the art. (See U.S. Pat. No. 3,957,354 and copending U.S. patent application Ser. No. 671,105 filed Mar. 29, 1976. A conventional projector or viewer is ordinarily employed for projecting the zero diffraction order image of such a subtractive diffractive filter. In particular, a diffractive subtractive filter may comprise a surface relief pattern of diffractive structures impressed in a transparent medium having an index of refraction greater than the surrounding air. The operation of the projector depends upon the surface relief pattern diffractive structure being able to deflect all the higher diffraction orders beyond the aperture of the imaging lens of the projector, so that only the zero diffraction order passes through the projection lens and is imaged on a screen.

In the special cases where the effective width of the projector light source is made much larger than usual to provide an extraordinarily large amount of light flux and/or the numerical aperture of the projection lens is much larger than usual, an impractically high diffractive-structure effective spatial line frequency is required to provide a sufficiently large diffraction angle to insure the entire exclusion of all first-order diffraction light from the aperture of the projector imaging lens. The present invention is directed to a novel projector which does not require the diffraction angle to be so large, and yet accommodates the special cases referred to above.

This and further advantages of the present invention will become more apparent from the following detailed description taken together with the accompanying drawing in which.

Figure 1:
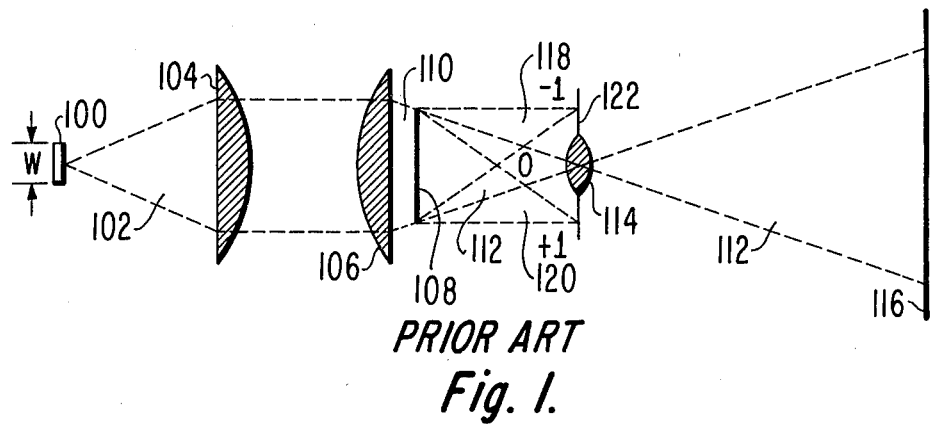
FIG. 1 is a schematic diagram of a conventional prior art diffractive subtractive filter projection system.

Referring now to FIG. 1, there is shown a schematic diagram of a conventional projector (e.g., a slide projector, microfiche viewer, or motion picture projector) which can ordinarily be employed to project a zero-order image of a diffractive subtractive filter on a screen. Specifically, such a prior art conventional projector comprises a light source in the form of incandescent filament 100, which emits a diverging beam of polychromatic (normally white) light 102. Condensing optics, in the form of condenser lens 10 and 106, cause a transparent medium 108, having embossed thereon a surface relief pattern diffractive subtractive filter defining zero-order picture information, to be illuminated with a beam of converging light 110. Emerging from transparent medium 108 is zero order light 112 which is incident on imaging lens 114. Therefore, zero order light 112 passes through imaging lens 114 to project an image of the picture information defined by diffractive subtractive filter of transparent medium 108 on screen 116.

At the same time, the diffractive subtractive filter of transparent medium 108 diffracts the higher diffraction orders, such as −1 diffraction order light 118 and +1 diffraction order light 120 by a sufficient amount so that they intersect principal plane 122 of imaging lens 114 at points beyond the aperture of imaging lens 114, as indicated in FIG. 1.

As further indicated in FIG. 1, filament 100 has a finite width W, so that the projector light source is not a true point or line source. For this reason, the zero order light and the higher diffraction order light each exhibit a finite width in principal plane 122 of imaging lens 114. The aperture of the imaging lens 114 fits to the largest width of the zero order light. As the effective width W of filament 100 and the aperture of the imaging lens 114 increases, the value of the minimum diffraction angle required to ensure that no portion of the higher diffraction orders, such as first diffraction orders 118 and 120, fall within the aperture of imaging lens 114 also increases. In more quantitative terms, $$\sin \theta > W/f; \tag{1}$$

where $\theta$ is the diffraction angle for the shortest wavelength component $\lambda$ (normally 0.4–0.5 nanometers) of light 102 and $f$ is the focal lengths of each of condenser lenses 104 and 106, respectively. However, as known in the art, $$\sin \theta = \lambda/d; \tag{2}$$

where $d$ is the effective coarsest line spacing of any of the diffractive structures of the subtractive diffractive filter. Therefore, $$f/W > d/\lambda; \tag{3}$$

so that as the value of $W$ becomes larger, the value of $d$ becomes smaller.

In practice, one tends to make the value of $d$ as small as possible. However, for $d$ smaller than 3 micrometers implemental difficulties increase rapidly. Thus, with the lowest wavelength of the spectrum of illuminating light, $\lambda$, having a value between 0.4 and 0.5 micrometers, a practical value for the ratio between $f$ and $d$ becomes $$f/W > 6. \tag{4}$$

Most present commercial projectors satisfy this condition. However, exceptions are to be found in extremely bright projectors and those with a light source filament arrangement which is very unlike a point or line source. The present invention offers a way of building still brighter projectors and also a simple way of modifying existing projectors which do not satisfy equations (3) and (4).

Figure 2:
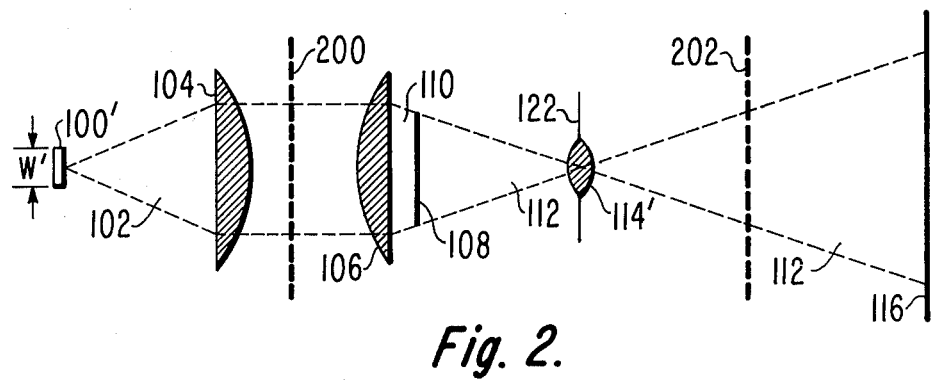
FIG. 2 is a schematic diagram of a diffractive subtractive filter projection system embodying the present invention.

Referring now to FIG. 2, there is schematically shown a projector, generally similar to the prior art projector shown in FIG. 1, but which is modified in accordance with the principles of the present invention. For instance, while a typical prior art filament 100, shown in FIG. 1, may have an effective width (maximum cross sectional dimension) of about 6 mm, the effective width W' of filament 100' in FIG. 2 may be substantially greater than a value such as 6 mm. This permits filament 100'to emit a significantly greater amount of total light flux because of its greater surface area. However, at the same time the value of the ratio $f:W$ is lowered below that required by equation (4) above. To overcome this problem, FIG. 2 includes a first mask 200 occupying a first plane situated between condensing lens 104 and condensing lens 106. First mask 200 comprises a plurality of spaced transparent regions, which may be parallel slits, separated by opaque regions. FIG. 2 further includes second mask 202 occupying a second plane between imaging lens 114' and screen 116. The second plane occupied by second mask 202 substantially coincides with the image plane of the first plane occupied by first mask 200. Further, a second mask 202 comprises spaced transparent regions which, in the absence of the diffractive subtractive filter, are positioned to substantially coincide with the respective images of the transparent regions of first mask 200. The spaced transparent regions of second mask 202 are separated by opaque regions. The spacing distance between adjacent transparent regions of first mask 200 are sufficiently small to insure that all portions of the surface relief pattern diffractive subtractive filter of medium 108 are sampled by illuminating light.

By definition, the direction of solely the zero order light emerging from a medium 108 is not affected by the presence of the diffractive subtractive filter relief pattern. Therefore, the portion of the zero order light which originates from any particular one of the transparent regions of first mask 200 will be imaged on and passed through the corresponding transparent region of second mask 202. However, the higher diffraction orders of light will be deflected, so that most, if not all, of the light in the higher diffraction orders will be intercepted by the opaque regions of second mask 202. Therefore, in the case of the projector shown in FIG. 2, it is not necessary that substantially the entire amount of light in all the higher deflection orders be deflected beyond the aperture of imaging lens 114'. This means that a larger numerical aperture imaging lens, which collects more light flux, can be accommodated than is the case for the prior art projector shown in FIG. 1.

The disadvantage of the particular embodiment of the present invention shown in FIG. 2 is that the opaque regions of first mask 200 result in the waste of a substantial amount of the light flux emitted from filament 100'. This disadvantage can be overcome by the modification of the present invention shown in FIG. 2a.

Figure 2A:
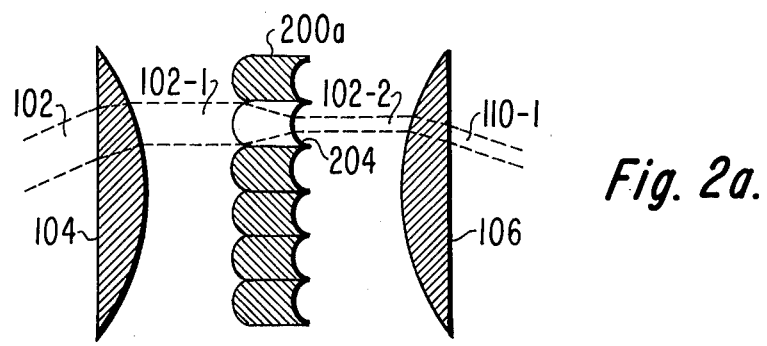
FIG. 2a illustrates a modification of the embodiment of the present invention shown in FIG. 2.

Referring to FIG. 2a, first mask 200 in FIG. 2 is replaced by lenticular lens array 200a in FIG. 2a. Lenticular lens array 200a is composed of a plurality of contiguous lenslets, such as lenslet 204, each of which concentrates the portion 102-1 of light beam 102 incident thereon into a narrow beam 102-2. Narrow beam 102-2, together with the corresponding narrow beams from the other lenslets of lenticular array 200a, after passing through condensing lens 106, form narrow-beam portions of beam 110, such as narrow beam portion 110-1. In all other respects, the projector modified in accordance with FIG. 2a is identical to that shown in FIG. 2.

With the use of a lenticular lens array, such as lenticular lens array 200a, it is possible to replace the light source comprising filament 100'and condensing lens 104 with a plurality of filaments arranged in a spaced array of either point sources corresponding individually to each lenslet or, alternatively, line sources corresponding to individual rows of lenslets. Further, such a substitution of an array of filaments requires that either lenticular array 200a itself or an auxiliary lenticular array operate to condense the light from each of the plurality of filaments so that it passes through the proper lenslet of array 200a to provide a narrow beam portion, such as narrow beam portion 102-2 and 110-1.

A diffractive subtractive filter consisting of two gratings with identical line spacings superimposed at a 90° angle may be employed for producing black-and-white pictures (sinusoidal gratings) or color pictures (rectangular gratings). Then, masks 200 and 202 of FIG. 2 may consist of equispaced transparent and opaque stripes oriented at an angle of 45° with respect to the grating lines. A somewhat more complex distribution of the transparent regions of the masks is required, when the surface relief pattern of a subtractive diffractive filter manifesting a color picture consists of the superposition of three angularly-displaced, square-wave diffraction gratings, each of which manifests a different subtractive primary color which is determined solely by the optical amplitude of each of the square-wave gratings as more fully described in currently allowed U.S. patent application Ser. No. 546,401. Thus, as shown in FIG. 3 by way of example, minus green (magenta) may be provided by a vertically-oriented square-wave grating; minus red (cyan) may be provided by a square-wave grating located 60° in a clockwise direction with respect to the vertical, and minus blue (yellow) may be provided by a square-wave grating located 60° in a counter-clockwise direction with respect to the vertical.

Figure 3:
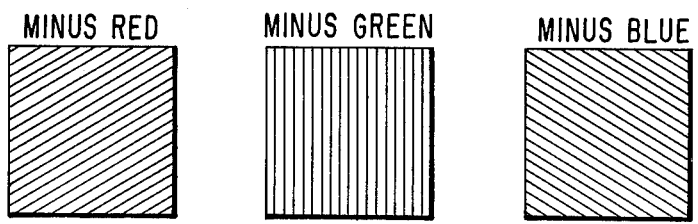
FIG. 3 is a diagram illustrating the respective diffraction grating orientation of a typical color subtractive diffractive filter.
Figure 4:
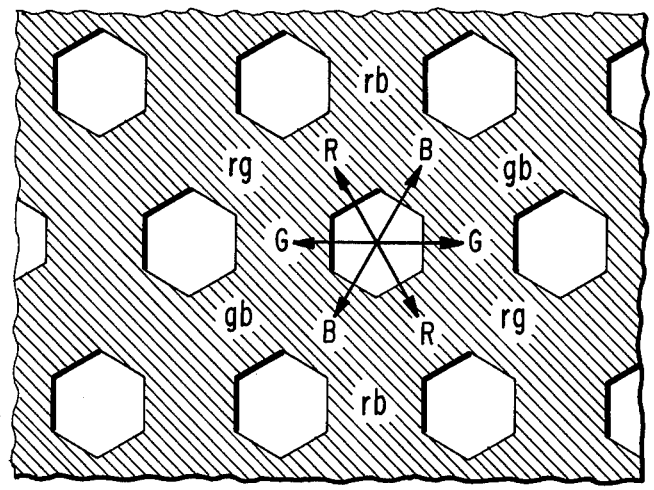
FIG. 4 illustrates a hexagonal mask pattern suitable for use with the typical diffraction grating orientation shown in FIG. 3.

FIG. 4 shows a hexagonal mask which may be employed with the three superimposed square-wave gratings having the orientations shown in FIG. 3. In particular, the mask pattern in FIG. 4 consists of an array of hexagonal holes, in which the size of the pattern is chosen such that the first-order diffracted images are shifted by the diameter of one hexagon. The letters R, G, B in FIG. 4 mark the places where the corresponding first-order diffracted light from one specific hole "0" is absorbed. Furthermore, the important intermodulation terms, marked by rg, gb, and br, are also stopped. Some higher order terms may well pass together with the zero-order light, but experimental tests show that color quality is not affected.

If a hexagonal mask is employed for both first mask 200 and second mask 202, the optical light efficiency is only 25%. However, by the use of lenticular lens array 200a, with or without an array of filaments, together with a larger projector imaging lens 114', the optical light efficiency may be improved so that there is no loss of picture brightness.

Figure 5:
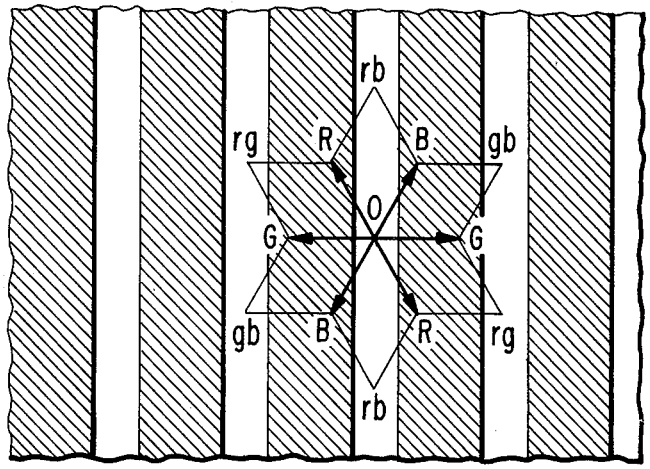
FIG. 5 shows a stripe mask suitable for use with the typical diffraction grating orientation shown in FIG. 3.

An alternative to the hexagonal mask shown in FIG. 4 is the stripe mask shown in FIG. 5. The stripe mask shown in FIG. 5 consists of transparent line regions separated by opaque stripes with a width ratio of 1:2. For an arbitrary point "0" on one particular line, the first-order diffracted images are indicated and labeled as in FIG. 4. FIG. 5 shows that some of the intermodulation terms can get through, reducing the contrast ratio of the picture compared to that obtained in FIG. 4. However, experiments show that color quality still is good. If both first mask 200 and second mask 202 are provided in accordance with FIG. 5, the mask efficiency is 33%. However, the use of lenticular array 200a, with or without an array of filaments, can be used to increase optical efficiency.

What is claimed is:

1. In a zero-order diffractive subtractive filter projector comprising an imaging lens having a given aperture, and illuminating means for illuminating a diffractive subtractive filter with incident light to derive zero-order output light for imaging on a screen by said imaging lens; the improvement comprising:

a mask situated in a given plane located between said imaging lens and said screen, said mask comprising a plurality of spaced transparent regions arranged in a predetermined array with adjacent transparent regions being separated by opaque regions, and said illuminating means including means for deriving a plurality of spaced light beams arranged in a given array corresponding with said predetermined array, said given array of light beams being situated so that, in the absence of a diffractive subtractive filter in said projector, said imaging lens substantially images said respective light beams of said given array on said respective transparent regions of said mask, whereby in the presence of a diffractive subtractive filter in said projector said zero-order output light passes through said transparent regions of said mask, but higher diffraction order output light is substantially blocked by said opaque regions of said mask.

2. The projector defined in claim 1, wherein said illuminating means includes a filament having a given width, a first condensing lens having a given focal length for collimating light emitted by said filament, and a second condensing lens having said given focal length spaced from said first condensing lens, and wherein said means for deriving a plurality of spaced light beams is situated in a predetermined plane between said first and second condensing lenses, said given plane being the image plane of said predetermined plane.

3. The projector defined in claim 2, wherein said means for deriving a plurality of spaced light beams is another mask comprising a plurality of transparent regions arranged in said given array with adjacent transparent regions of said given array being separated by opaque regions of said other mask.

4. The projector defined in claim 2, wherein said means for deriving a plurality of spaced light beams is a lenticular array of lenslets arranged in said given array.

5. The projector defined in claim 1, wherein said transparent regions of said mask comprise substantially equally spaced stripes having substantially the same given width with the spacings between adjacent stripes occupied by said opaque regions having a width substantially equal said given width.

6. The projector defined in claim 1, wherein said transparent regions of said mask comprise an array of spaced regular hexagons of substantially equal given size with the spacing between adjacent hexagons occupied by said opaque regions of said mask being substantially equal to said given size of one of said hexagons.

7. The projector defined in claim 1, wherein said transparent regions of said mask comprise substantially equally spaced stripes having substantially the same given width with the spacing between adjacent stripes occupied by said opaque regions having a width substantially double said given width.

* * * * *